3,027,393
PREPARATION OF ORGANOTIN COMPOUNDS
Herbert Jenkner, Hannover-Wülfel, and Hans Werner Schmidt, Hannover-Kirchrode, Germany, assignors to Kali-Chemie Aktiengesellschaft, Hannover, Germany
No Drawing. Filed July 11, 1957, Ser. No. 671,140
Claims priority, application Germany July 14, 1956
5 Claims. (Cl. 260—429.7)

The invention relates to a new process of preparing organotin compounds.

In carrying out the process of the invention, a tin halide compound, such as tin tetrachloride, and complex compounds thereof with alkali metal halides such as $K_2SnCl_6$ and also hydrocarbon tin halides are reacted with organo aluminum compounds in the presence of inorganic metal halides which form complex compounds with the aluminum halide formed during the reaction. Such inorganic metal halides are particularly alkali metal chlorides, but other metal halides such as the chlorides of calcium, barium, or zinc, may also be used, though they are less suitable than the alkali metal halides. In a modification of the process, the halides to be chemically bound to aluminum halide may be added after the reaction between the tin halide and the organo-aluminum compound has been terminated.

Suitable organo-aluminum compounds are compounds of the general formula $R_xAlCl_y$ wherein R is alkyl, $x$ is an integer from 1 to 3, $y$ is an integer from 0 to 2, $x+y=3$; such compounds are aluminum alkyls and aryls, and the etherates thereof, as well as alkyl and aryl aluminum chlorides. I prefer to use aluminum trialkyls, wherein the alkyl group has 1 to 4 C atoms, but the hexyl to octyl and even higher alkyl compounds may also be used, though they are less suitable for the reaction because the stability of the aluminum alkyls decreases with increasing size of the organic radical.

According to the ratio of the reactants used, the obtained products are tin hydrocarbon compounds or hydrocarbon tin halides. The reaction proceeds, for instance, according to the following equations:

(1)  $3SnCl_4+4AlR_3+4NaCl \rightarrow 3SnR_4+4NaAlCl_4$
(2)  $SnCl_4+2AlR_3+2NaCl \rightarrow SnR_4+2NaAlRCl_3$
(3)  $SnCl_4+AlR_3+NaCl \rightarrow SnR_3Cl+NaAlCl_4$ wherein R is alkyl or aryl.

The added sodium or other metal chloride complexes the aluminum chloride formed during the reaction. Said aluminum chloride complex has a considerably higher boiling point than the aluminum chloride itself. This results in the following advantages:

(1) The obtained organotin compound can be distilled out of the reaction mixture without the risk of the reverse reactions or clogging of the apparatus produced in the presence of uncomplexed aluminum chloride.

(2) The aluminum chloride complex compound is insoluble in the organotin compounds and precipitates on cooling as a solid substance on the bottom of the reaction vessel; therefore, the obtained organotin compound can be readily separated from the aluminum complex compound by decantation or centrifugation.

Generally, we use the organo-aluminum compound in an excess of about 5 to 10 percent of the amount required for the desired reaction; if such excess would interfere with the recovery of the pure organo-tin compound by distillation, we may add to the reaction mixture $AlCl_3$ in an amount sufficient to form $AlRCl_2$, which latter compound forms also with the added alkali metal chloride a complex such as $NaAlRCl_3$.

The reaction may be carried out in the presence or absence of solvents or diluting agents, whereby the organotin compound obtained as reaction product may itself be added as a solvent or diluent. The reaction temperature will depend on the specific reactants used and will be in the range of about 20 to 200° C.; we prefer the range of about 40 to 150° C. If the organo-aluminum compound is added very quickly, it may be necessary to cool the mixture in order to maintain the reaction within the recited temperature limits.

As solvents we may use any organic solvent which does not react with the components of the reaction, and preferably liquids having a boiling point sufficiently different from the boiling point of the obtained organotin compound. Suitable solvents are for instance: aliphatic hydrocarbons, such as hexane, heptane, octane; aromatic hydrocarbons such as benzene, toluene, methyl naphthalene; halogenated hydrocarbons such as methylene chloride, chloroform; also cyclohexane, methyl cyclohexane, ethers, and mineral oils, particularly the high boiling mineral oils ($B_{.1}=180-250°$ C.). Organotin compounds made by the process of the invention may be used, for example, as intermediates in the preparation of stabilizers for vinyl chloride resins or in the preparation of additives to lubricating oils.

The following examples are given to illustrate the invention, but it should be understood that these are given by way of illustration and not of limitation, and that many variations in the compounds given and the amounts indicated can be made without departing from the spirit of the invention and the scope of the appended claims.

All parts are given by weight, unless indicated otherwise.

*Example 1*

33 parts of sodium chloride were added to a solution of 57 parts of triethyl aluminum in 150 cc. of hexane. Subsequently, a solution of 65.2 parts of tin tetrachloride in 100 cc. of hexane was added drop by drop at a temperature of 60–80° C. An immediate reaction took place; after the reaction had been substantially completed, 10 parts of $AlCl_3$ and then 10 parts of sodium chloride were added.

From the reaction mass, 50 parts of tetraethyl tin (more than 87% of the theory) were recovered by distillation.

*Example 2*

A solution of 130.5 parts of tin tetrachloride in 100 cc. of hexane was added dropwise with stirring to a solution of 57 parts of aluminum triethyl in 150 cc. of hexane. The exothermic reaction was kept at a temperature of 40–80° C., whereby a dark lower and a colorless upper layer was formed. After addition of 30 parts of sodium chloride, the lower layer cleared up, whereupon the solvent was distilled off. From the residue, triethyl tin monochloride was obtained in a yield of more than 85 percent; in addition, 10 percent of diethyl tin dichloride were obtained. The total distillate amounted to 110 parts.

*Example 3*

In similar manner as described in Example 2, 57 parts of triethyl aluminum were reacted at 40–80° C. with 195.4 parts of tin tetrachloride (solvent 250 cc. of hexane). After completion of the reaction, 30 parts of sodium chloride were added, and the solvent was distilled off. By distillation of the residue, 166 parts of diethyl tin dichloride, which could be further alkylated with triethyl aluminum, and 6 parts of a mixture of tetraethyl tin and triethyl tin monochloride were obtained.

*Example 4*

330 g. of sodium chloride were added to a solution of 570 g. of triethyl aluminum in 593 g. of tetraethyl tin; subsequently, a mixture of 652 g. of tin tetrachloride and 1763 g. of tetraethyl tin (formation of ethyl tin chlorides) was added dropwise. The temperature of the exothermic reaction was maintained at 80–95° C. The reaction mixture remained colorless during the whole time.

On distillation, the tetraethyl tin used as a solvent was recovered and 540 g. of additional tetraethyl tin were obtained, corresponding to a yield of 91%. The chloride content of the distilled tetraethyl tin was below .2%.

*Example 5*

A mixture of 2645 g. of tetraethyl tin and 978 g. of tin tetrachloride was added, drop by drop with stirring, to a mixture of 570 g. of triethyl aluminum and 330 g. of sodium chloride. The reaction temperature was 80–90° C. Tetraethyl tin was obtained by distillation in a yield of 86 percent. $NaAlCl_4$ remained as a white residue.

*Example 6*

33 g. of sodium chloride were added to a solution of 57 g. of triethyl aluminum in 150 cc. of methylene chloride. Then a solution of 65.2 g. of tin tetrachloride in 100 cc. of methylene chloride was added dropwise with stirring. The reaction temperature was 40–45° C. After evaporation of the methylene chloride, 57 g. (=93.5% of the theory) of tetraethyl tin were recovered by distillation. The chlorine content was .4%.

If the example was repeated but without the addition of sodium chloride, a dark brown reaction mixture, instead of a colorless mixture, was obtained, and the distillation product contained a large amount of aluminum and chlorine.

If the sodium chloride was not added at the start of the reaction but immediately prior to distillation, a completely colorless tetraethyl tin was obtained, and in addition some triethyl tin monochloride and diethyl tin dichloride.

*Example 7*

To a solution of 57 g. of triethyl aluminum in 250 cc. of methylene chloride, there were added 41 g. of potassium chloride with stirring; subsequently, a solution of 98 g. of tin tetrachloride in 100 cc. of methylene chloride was added drop by drop at such a rate that a gentle methylene chloride reflux was maintained. After evaporation of the solvent, 69 g. of tetraethyl tin (80% of theory) were obtained by distillation.

*Example 8*

154 g. of potassium in hexachloride ($K_2SnCl_6$) were added in portions, with stirring, to a solution of 57 g. of triethyl aluminum in 200 cc. of methylene chloride. After evaporation of the solvent, 60 g. of tetraethyl tin were obtained by distillation.

*Example 9*

35 parts of tributyl aluminum and 11 parts of sodium chloride were mixed with 60 parts of methylene chloride. Then, a mixture of 30.4 parts of tin tetrachloride in 60 parts of methylene chloride were added dropwise with stirring and reflux condensation. After the reaction was completed, first the solvent and then the obtained tetrabutyl tin was distilled off. 39.6 parts of tetrabutyl tin were obtained, corresponding to a yield of 97 percent.

*Example 10*

The reaction was carried out in an iron reaction vessel of about 30 liter capacity; the vessel was filled with a solution of 1000 g. of $SnCl_4$ in 5000 g. of a mineral oil ($B_1$=190–210° C.), in which 1820 g. of NaCl were suspended, and a solution of 3360 g. of triethyl aluminum in 3000 g. of the same mineral oil was added in such a way that after addition of about each 1000–2000 g. of the $Al(C_2H_5)_3$-mineral oil mixture another amount of 1000 g. of $SnCl_4$ was introduced. The temperature was kept at about 100–110° C. In this way, a total amount of 5480 g. of $SnCl_4$ was reacted with 3360 g. of $Al(C_2H_5)_3$ within 2 hours. By distillation in vacuo, 4692 g. of $Sn(C_2H_5)_4$ were obtained, corresponding to a yield of 95.3%.

Without opening the reaction vessel, fresh amounts of $SnCl_4$, NaCl, and $Al(C_2H_5)_3$ were introduced into the mineral oil-$NaAlCl_4$ mixture which had remained in the vessel after the vacuum distillation. The procedure was the same as described for the first step. In this way, further 5680 g. of $SnCl_4$ and 3480 g. of $Al(C_2H_5)_3$ were brought to reaction, whereby in this step the triethyl aluminum was added in the undiluted state. Also in this second step, the yield was more than 95 percent of the theory.

After cooling down of the reaction vessel, the greater portion of the mineral oil used as diluent could be siphoned off from the solid residue.

If $Sn(C_2H_5)_4$ is used as a diluent, instead of mineral oil, it is of advantage to add mineral oil before $Sn(C_2H_5)_4$ is distilled off in order to obtain a substantially complete distillation. For a complete removal of the tetraethyl tin, it is also possible to extract the residue with hexane, light benzene, or the like.

We claim:

1. A method for the preparation of alkyl tin and alkyl tin chlorides, comprising heating a member of the group consisting of tin tetrachloride, alkali metal tin chlorides, and alkyl tin chlorides at a temperature of 40 to 200° C. with a compound selected from the group consisting of compounds of the formula $$R_xAlCl_y$$

wherein R is alkyl, $x$ is an integer from 1 to 3, $y$ an integer from 0 to 2, $x+y=3$, complexing the aluminum chloride formed in the reaction with an alkali metal chloride to a complex aluminum chloride having a higher boiling point than said aluminum chloride, and separating the obtained organotin compound from said complex aluminum chloride.

2. The method as defined in claim 1, wherein said alkali metal chloride is sodium chloride.

3. The method as defined in claim 1, wherein the reaction is carried out in an organic liquid solvent.

4. The method as defined in claim 1, wherein tetraalkyl tin is used as a solvent.

5. A method of preparing tetraethyl tin comprising heating one mole of tin tetrachloride with about 1.3 to 2.3 moles of triethyl aluminum at a temperature of about 40 to 150° C. in the presence of sodium chloride to convert the aluminum chloride formed during the reaction substantially to sodium aluminum chloride, and distilling off the formed tetraethyl tin from said sodium aluminum chloride, said sodium chloride being applied in an amount at least equimolar to the amount of said triethyl aluminum.

References Cited in the file of this patent

UNITED STATES PATENTS 2,739,165     Plueddemann            Mar. 20, 1956

FOREIGN PATENTS 934,649      Germany               Nov. 3, 1955
540,135      Belgium                Jan. 27, 1956
1,120,344    France                  Apr. 16, 1956